(12) United States Patent
Huttenhower

(10) Patent No.: US 7,617,089 B2
(45) Date of Patent: Nov. 10, 2009

(54) METHOD AND APPARATUS FOR COMPILING TWO-LEVEL MORPHOLOGY RULES

(75) Inventor: Curtis E. Huttenhower, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 1272 days.

(21) Appl. No.: 10/406,021

(22) Filed: Apr. 3, 2003

(65) Prior Publication Data

US 2004/0199376 A1    Oct. 7, 2004

(51) Int. Cl.
G06F 17/27    (2006.01)
(52) U.S. Cl. .......................................................... 704/9
(58) Field of Classification Search ................... 704/9, 704/10
See application file for complete search history.

(56) References Cited

U.S. PATENT DOCUMENTS

| | | | |
|---|---|---|---|
| 6,032,111 A * | 2/2000 | Mohri | 704/9 |
| 6,760,636 B2 * | 7/2004 | Kempe | 700/94 |
| 7,010,476 B2 * | 3/2006 | Karttunen et al. | 704/1 |

FOREIGN PATENT DOCUMENTS

EP    1 471 440 A    10/2004

OTHER PUBLICATIONS

Alegria et al, "Improving a Robust Morphological Analyser Using Lexical Transducers", Recent Advances in Natural Language Processing, Sep. 14-16, 1995, pp. 199-204.*
Karttunen, L., "Finite-State Constraints," The Last Phonological Rule, Goldsmith, J. (Editor), pp. 1-17 (1993).
Alegria, I. et al., "Using Finite State Technology in Natural Language Processing of Basque," Implementation and Application of Automata, 6th International Conference, CIAA 2001, pp. 1-12 (2001).
Karttunen, L., "A Short History of Two-Level Morphology," pp. 1-15 (Sep. 28, 2001).
Kay, M., "Nonconcatenative Finite-State Morphology," Proceedings of the Third Meeting of the European Chapter of the Association for Computational Linguistics, pp. 2-10 (1987).
Zajac, R., "Feature Structures, Unification and Finite-State Transducers," International Workshop on Finite State Methods in Natural Language Processing (1998).
Kempe, A., "Reduction of Intermediate Alphabets in Finite-State Transducer Cascades," Conference TALN 2000, Lausanne, pp. 207-215 (Oct. 16-18, 2000).

(Continued)

*Primary Examiner*—Angela A Armstrong
(74) *Attorney, Agent, or Firm*—Theodore M. Magee; Westman, Champlin & Kelly, P.A.

(57) ABSTRACT

A method of compiling orthography rules includes compiling first and second orthography rules into individual Finite State Transducers by inserting elements of the rules into Finite State Transducer Templates. The individual Finite State Transducers are combined to form a single combined Finite State Transducer. Under one embodiment, Finite State Transducers are first combined based on a common core in the Finite State Transducers. The combined Finite State Transducers for the cores are then combined to form a single Finite State Transducer for the set of orthography rules.

8 Claims, 10 Drawing Sheets

OTHER PUBLICATIONS

Walther, M., "Finite-State Reduplication in One-Level Prosodic Morphology," Proceedings of NAACL-2000, pp. 296-302 (2000).

Mou, X. et al., "Sub-Lexical Modelling Using A Finite State Transducer Framework," Proceedings of the 2001 International Conference on Acoustics, Speech and Signal Processing, 4 pages (May 2001).

5 pages downloaded from http://www.ics.uci.edu/~epstein/161/960222.html entitled "ICS 161: Design and Analysis of Algorithms Lecture Notes for Feb. 22, 1996" (2002).

3 pages downloaded from http://www.cs.engr.uky.edu/~lewis/essays/compilers/min-fa.html entitled "Minimizing Finite Automata" (2002).

Mohri, M., "Finite-State Transducers in Language and Speech Processing," Association for Computational Linguistics, pp. 1-41 (1997).

Alegria, "Improving A Robust Morphological Analyser Using Lexical Transducers," Recent Advances In Natural Language Processing, Sep. 14, 1995.

L. Karttunen, "Two-Level Rule Compiler," Technical Report, Xerox Palo Alto Research Center, Oct. 1992.

L. Karttunen, "Two-Level Morphology with Composition," Proceedings of the 14$^{th}$ Conference on Computational Linguistics, Aug. 23, 1992.

K. Koskenniemi, "A General Computational Model for Word-Form Recognition and Production," Proceedings of the 22$^{nd}$ Annual Meeting on Association for Computational Linguistics, 1984.

The European Search Report from Application No. 04008086.3, filed Apr. 2, 2004.

The Official Communication from Application No. 04008086.3, filed Apr. 2, 2004.

The Official Notice of Rejection from Application No. 2004-110408, filed Apr. 2, 2004.

An Office Action from the Chinese Patent Office in counterpart foreign application No. 200410035223.8 filed Mar. 31, 2004.

* cited by examiner

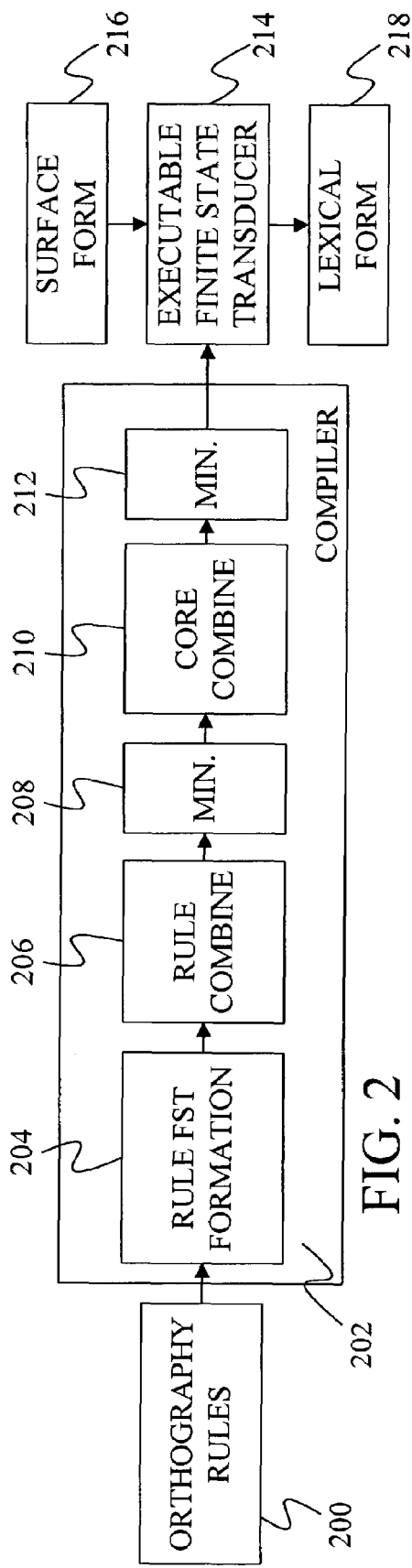
FIG. 2
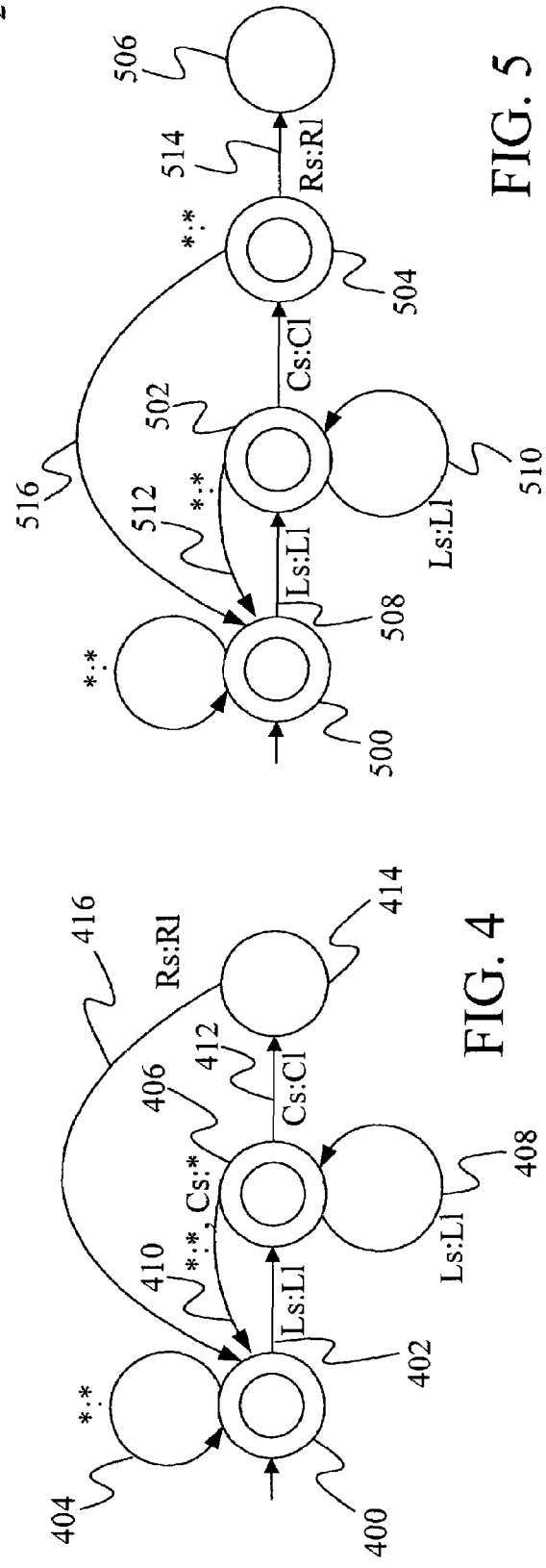
FIG. 4
FIG. 5

METHOD AND APPARATUS FOR COMPILING TWO-LEVEL MORPHOLOGY RULES

BACKGROUND OF THE INVENTION

The present invention relates to language processing. In particular, the present invention relates to converting a surface text into a lexical representation.

In language processing, it is common to convert a surface form of a word into a lexical form to remove variations in the spelling of the word caused by the morphology associated with different parts of speech. For example, the surface form of "happiness" would be converted into the lexical form "happy+ness" and "found" would be converted into "find" with a marker for past tense added to the lexical form. Such conversions simplify later processing of the words because fewer variations of the words need to be supported.

A common method of performing such conversions involves the use of Finite State Transducers. In a Finite State transducer, two states are connected by a transition that maps a character in the surface form of the word to a character or marking in the lexical form. Under many systems, the Finite State Transducers are generated based on a set of rules that describe the mapping from a character in the surface form to a character in the lexical form. Some of these rules include a left context, a right context, or both, that require more than two states in the Finite State Transducer. For example, if a rule for a conversion from i to y included a left context of "p:p", which requires a "p" in the surface form before the letter i and a right context of "n:n", which requires an "n" after the letter i, a complete Finite State transducer would include a beginning state, a transition for the letter p to a second state, a transition for the conversion i:y from the second state to a third state, and a transition for the letter "n" from the third state.

Two-level morphology Finite State Transducers are used to create a lexical form of a word by applying the surface form as input to the Finite State Transducers. At each state, a Finite State Transducer determines if the current character in the input can be used to take a transition from the current state, to a next state. If so, the Finite State Transducer moves along the transition to the next state and selects the next character in the input. If the current character does not match any of the transitions out of a state, the Finite State Transducer fails and returns to the beginning state of the Finite State Transducer.

Under the prior art, each portion of a rule: the left context, the core, and the right context, was defined as separate Finite State Transducers. Each of these Finite State Transducers was separately converted into a binary representation that could be used during morphology processing, also known as runtime.

At runtime, the various Finite State Transducers were combined dynamically based on the user input, thereby generating a single virtual FST that was tailored to the input.

Although combining Finite State Transducers at runtime provides working morphology systems, it greatly slows the morphology process.

SUMMARY OF THE INVENTION

A method of compiling orthography rules includes forming a core Finite State Transducer for a core of a rule and a context Finite State Transducer for a context of a rule. The core Finite State Transducer is combined with the context Finite State Transducer to form a rule Finite State Transducer based on a template associated with the operator of the rule. The rule Finite State Transducer is then used to create an executable Finite State Transducer. Under one embodiment, rule Finite State Transducers are further combined based on a common core in the Finite State Transducers to form core Finite State Transducers. The core Finite State Transducers are then combined to form a set Finite State Transducer for the set of orthography rules. The set Finite State Transducer is then converted into the executable Finite State Transducer.

BRIEF DESCRIPTION OF THE DRAWINGS

FIG. 2 is a block diagram of a system for forming and using Finite State Transducers under the present invention.

FIG. 4 is a state diagram for a "may occur" Finite State Transducer.

FIG. 5 is a state diagram for a "must occur" Finite State Transducer.

DETAILED DESCRIPTION OF ILLUSTRATIVE EMBODIMENTS

Figure 1:
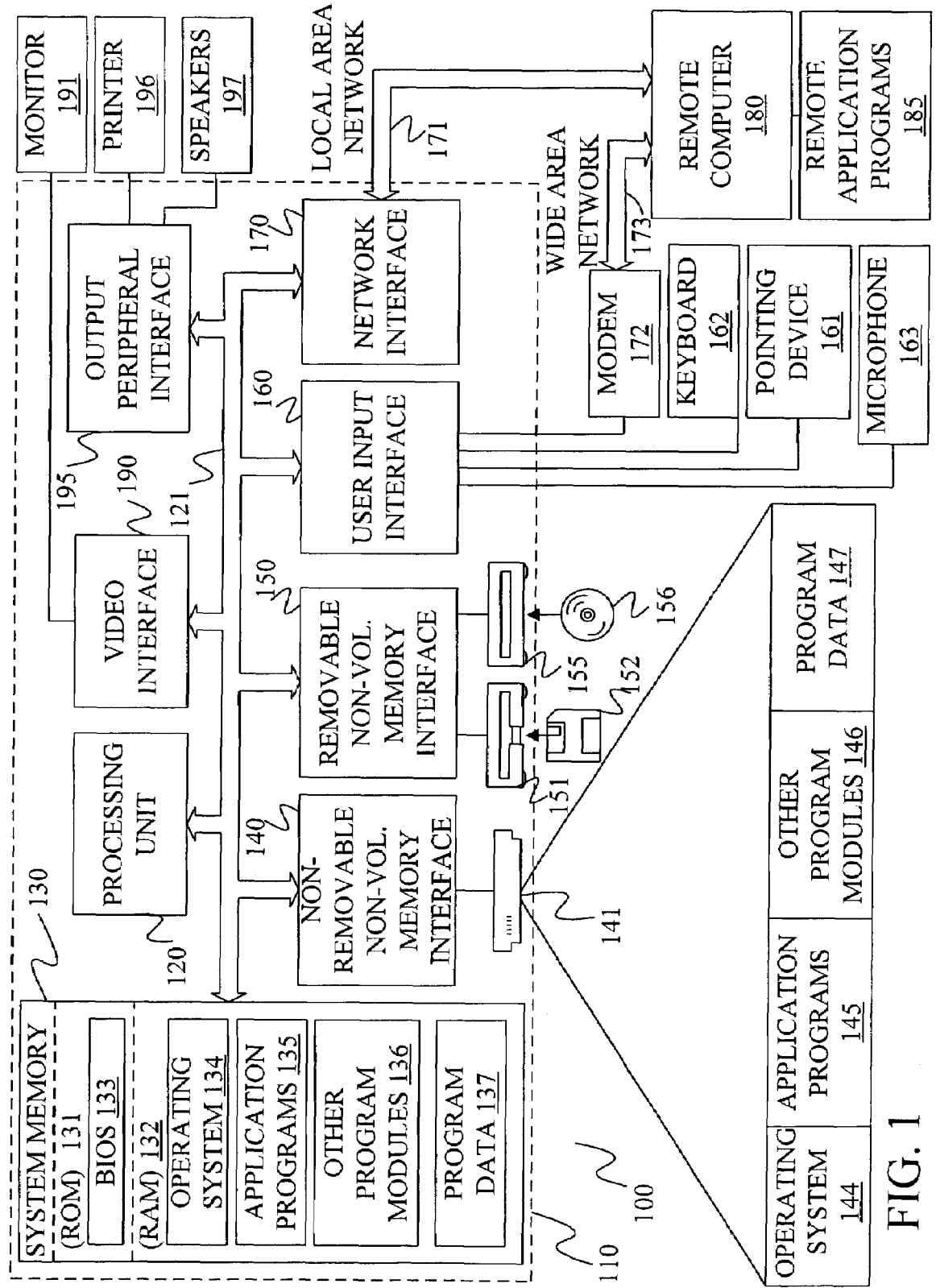
FIG. 1 is a block diagram of a general computing environment in which embodiments of the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention provides a method for constructing a Finite State Transducer that operates efficiently at runtime to convert surface linguistic forms into lexical forms.

Figure 3:
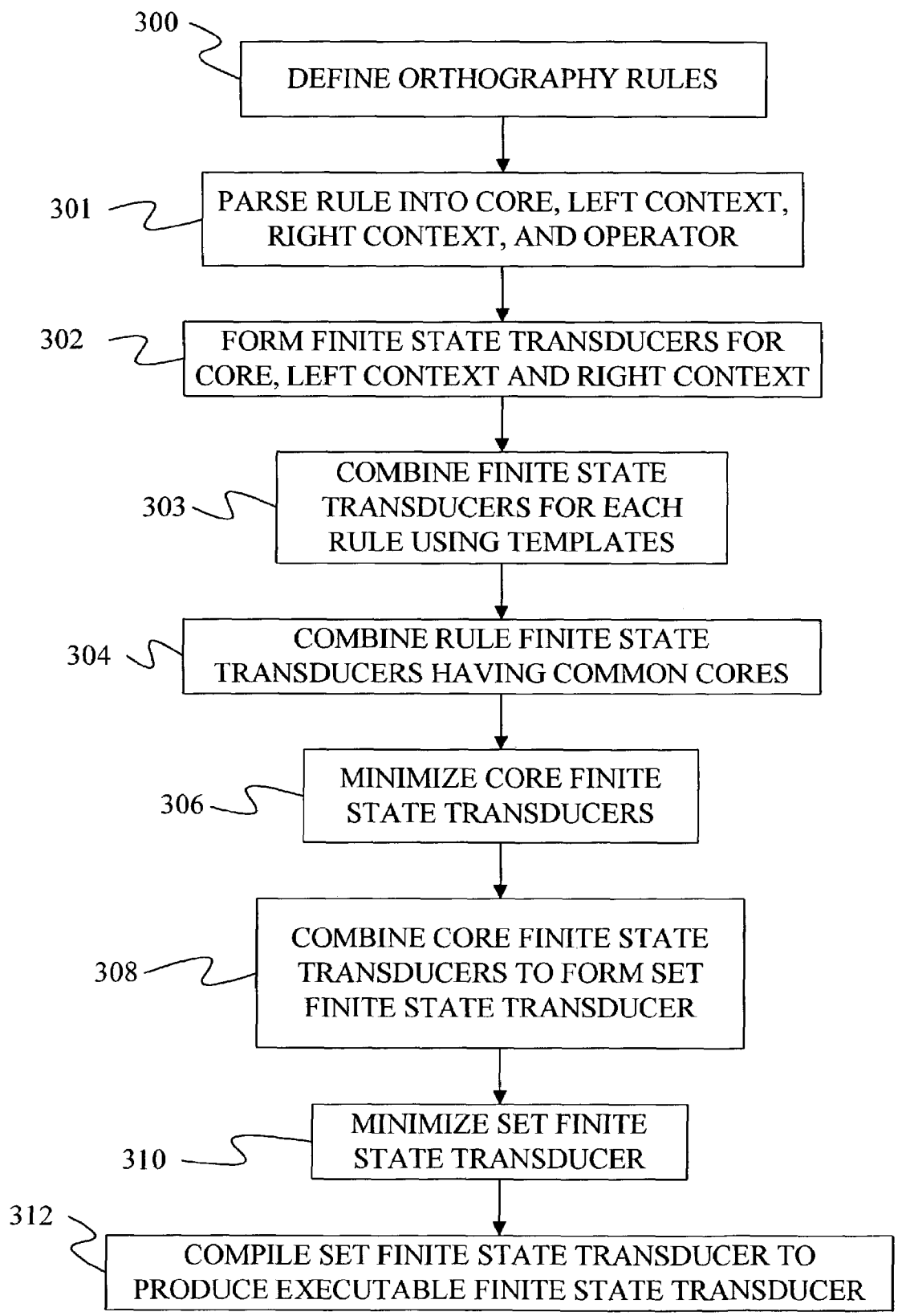
FIG. 3 is a flow diagram of a method of forming a Finite State Transducer under the present invention.

FIGS. 2 and 3 provide a simple block diagram and flow diagram, respectively, that show the basic operation of embodiments of the present invention. In step 300 of FIG. 3, a set of orthography rules 200 are written by a linguist to describe the possible conversions from a surface form to a lexical form. By default, it is assumed that each character in the surface form will be mapped to the same character in the lexical form. Each rule describes an exception to this default mapping.

Under one embodiment, each rule includes a core that defines the non-default mapping, a left context and a right context. Each of these elements is written as a pair of characters separated by a colon, with the character on the left representing a character in the surface form and the character on the right representing a character in the lexical form. Thus, the core "i:y" indicates a mapping from a surface form character "i" to a lexical form character "y". Similarly, a left context of "a:b" indicates that there is an "a" to the left of the surface form core character and that there is a "b" to the left of the lexical form core character. Typically, the characters in the surface form and the lexical form of the left context match each other, such as in "a:a". The surface form and lexical form characters of the right context also tend to match each other.

In one embodiment, there are four types of rules, based on whether the rule may occur, must occur, must occur if the surface form character of the core is found, or must not occur. Each of these rules is represented by a separate operator →, ⇆, ←, and > <, respectively. Typically, the rules are written in the following format:

core operator left-context---right-context

For example, the rule:
a:b→c:c---d:d represents a core mapping from "a" to "b" that may occur when there is a left context of c:c and a right context of d:d.

Orthography rules 200 are provided to a compiler 202. At step 302, Finite State Transducers are produced for each rule by a rule FST formation 204 in compiler 202. Rule FST formation 204 first parses each rule at step 301 to identify the core, operator, left context and right context of each rule. At step 302, rule FST formation 204 forms a separate FST for each core, left context and right context. The left context FST of each rule is then combine with the rule's respective core FST using a template associated with the operator of the rule. This combined FST is then combined with the respective right context FST for the rule to form a rule FST based on the same template.

Since there are four different possible operators there are four separate templates, one for each type of operator.

FIG. 4 shows the template Finite State Transducer for the may occur operator. The template includes three states 400, 406, and 414. States 400 and 406 represent accepting states that generate a success value when the Finite State Transducer ends in those states. State 414 is a rejecting state that generates a failure value when the Finite State Transducer ends in that state. In general, in the diagrams shown in the present application, accepting states are shown as two concentric circles and rejecting states are shown as a single circle.

In the template of FIG. 4, the left context for the rule is inserted along transition 402 between state 400 and state 406 as signified by Ls:Ll. The left context is also put along self-loop transition 408, which extends from and returns to state 406. Thus, in the Finite State Transducer, if the left context is encountered in the surface form and lexical form while the state transducer is in state 400 or state 406, the Finite State Transducer will move to state 406. State 400 also includes a default transition 404 that causes the Finite State Transducer to loop on state 400 until the left context is encounter.

The core, Cs:Cl is then inserted along transition 412 between state 406 and state 414. The surface form of the core, Cs, is used to form a pair with a "*" character, which represents any possible character in the lexical form. This pair is then inserted along transition 410 from state 406 to state 412. Thus, if the Finite State Transducer is in state 406, it will transition to state 414 if the core is encountered, it will return to state 406 if the left context is encountered again, and it will return to state 400 if any other values are encountered.

The right context, Rs:Rl, is inserted in transition 416 between states 414 and 400. If the right context is encountered while the Finite State Transducer is in state 414, the Finite State Transducer will return to state 400. However, if any other value is encountered in state 414, the Finite State Transducer will fail and end in rejecting state 414.

FIG. 5 provides the template Finite State Transducer for the must not occur operator. The template includes three accepting states 500, 502, and 504 and one rejecting state 506. The left context, Ls:Ll, is inserted in transition 508 between state 500 and state 502 and in the self-loop transition 510 for state 502. The core, Cs:Cl, is inserted in transition 512 between states 502 and 504 and the right context, Rs:Rl, is inserted between states 504 and 506.

In operation, the Finite State Transducer of FIG. 5 will transition to state 502 when the left context is encountered while in state 500 or state 502. If the core is encountered while in state 502, the Finite State Transducer will transition to state 504. If neither the core nor the left context are encountered while in state 502, the Finite State Transducer will return to state 500 along transition 512. If the right context is encountered while in state 504, the Finite State Transducer follows transition 514 to rejecting state 506 and the Finite State Transducer fails because it has encountered the sequence of left context, core, and right context. If the right context is not encountered at state 504, transition 516 is followed to state 500.

Figure 6:
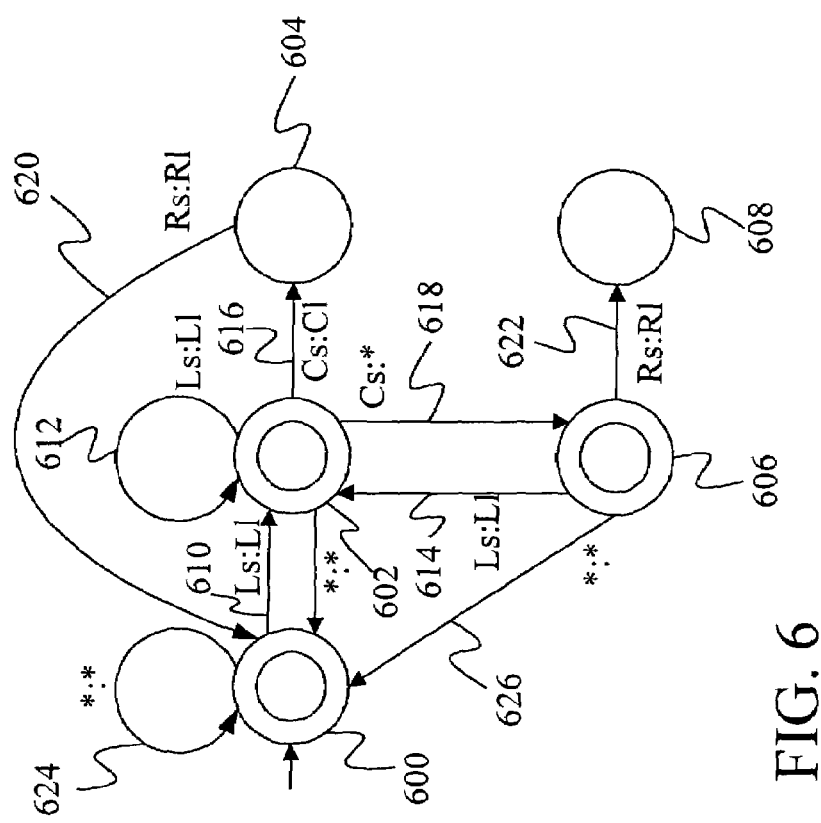
FIG. 6 is a state diagram for a "must occur if a core surface character occurs" Finite State Transducer.

FIG. 6 provides the template for the must occur if the semantic form of the core is encountered operator. The template of FIG. 6 includes accepting states 600 and 602 and rejecting state 604, which are similar to states 400, 406, and 414 of the may occur template of FIG. 4. The template also includes accepting state 606 and rejecting state 608. The left context, Ls:Ll, is inserted in transitions 610, 612, and 614, which end at state 602. The core, Cs:Cl, is inserted in transition 616 and the surface form character of the core, Cs, is combined with the "*" character for the lexical form and is inserted in transition 618. The right context, Rs:Rl, is inserted in transition 620 and transition 622.

When executing, the Finite State Transducer of FIG. 6 will move from state 600 to state 602 when it encounters the left context. If it does not encounter the left context, it will loop on state 600 along transition 624. In state 602, the Finite State Transducer will move to state 604 if it encounters the core, will loop on state 602 if it encounters the left context again, will transition to state 606 if it encounters the surface form character of the core with any value other than the lexical form character of the core, and return to state 600 for all other cases. In state 604, the Finite State Transducer will return to accepting state 600 if it encounters the right context. If it does not encounter the right context, the Finite State Transducer will fail at state 604.

In state 606, the Finite State Transducer will transition to failure state 608 if the right context is encountered. Thus, if a sequence containing the left context, the surface form of the core paired with a character other than the lexical form of the core, and the right context is encountered, the template will fail at state 608. If the left context is encountered at state 606, the Finite State Transducer will return to state 602. For any other values at state 606, the Finite State Transducer will return to state 600 along default transition 626.

Figure 7:
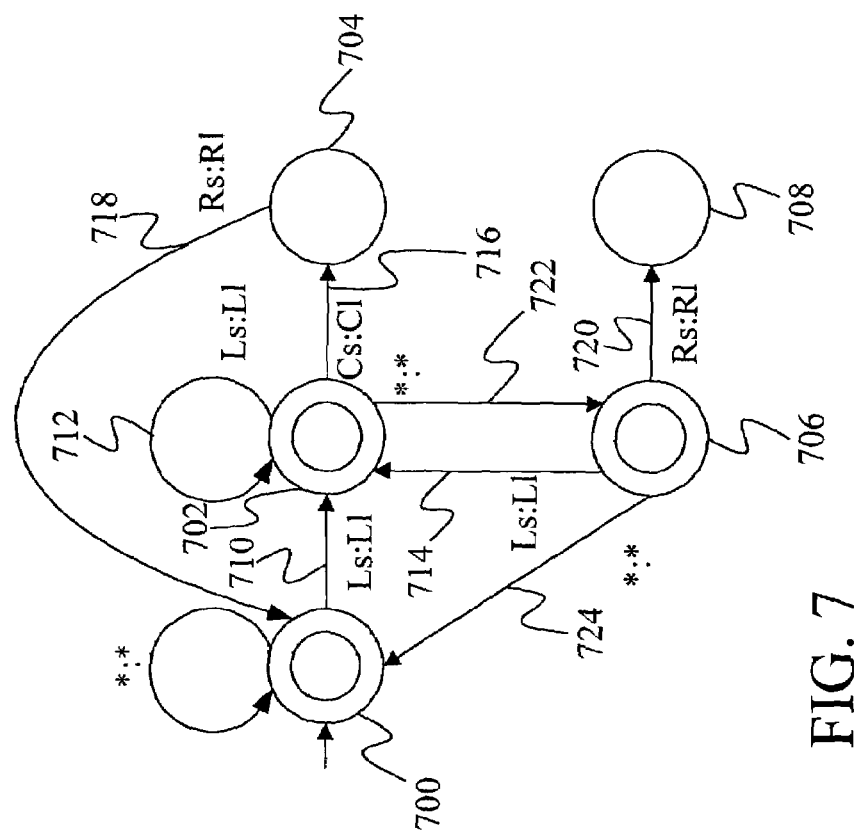
FIG. 7 is a state diagram for a "must not occur" Finite State Transducer.

FIG. 7 provides a template for the must occur operator. The template is similar to the template of FIG. 6 and includes three accepting states 700, 702, and 706 and two rejecting states 704 and 708. The left context is inserted on transitions 710, 712 and 714 into state 702, the core is inserted on transition 716 into state 704 and the right context is inserted into transition 718 into state 700 and transition 720 into state 708. Default transitions 722 and 724 are provided between states 702 and 706 and between states 706 and 700.

Figure 9:
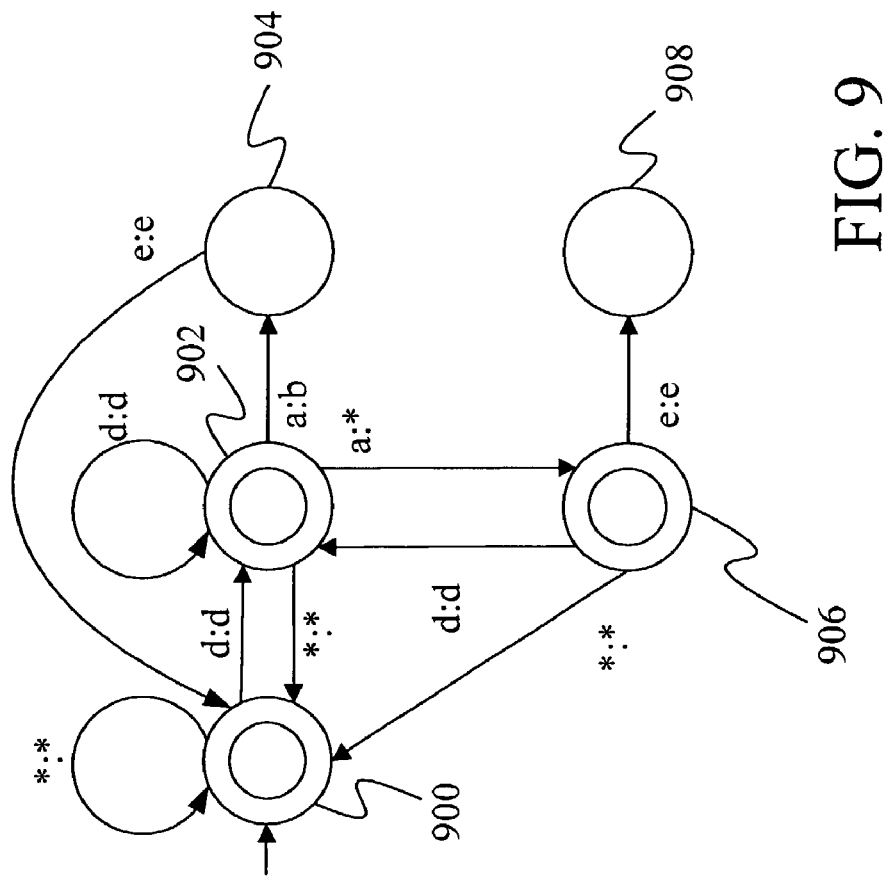
FIG. 9 provides a Finite State Transducer for a second rule with the same core as FIG. 8.
Figure 8:
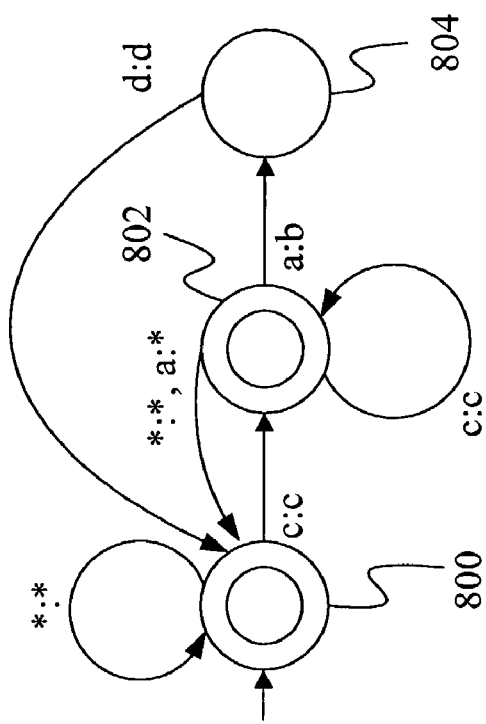
FIG. 8 provides a Finite State Transducer for a rule with a core.
Figure 10:
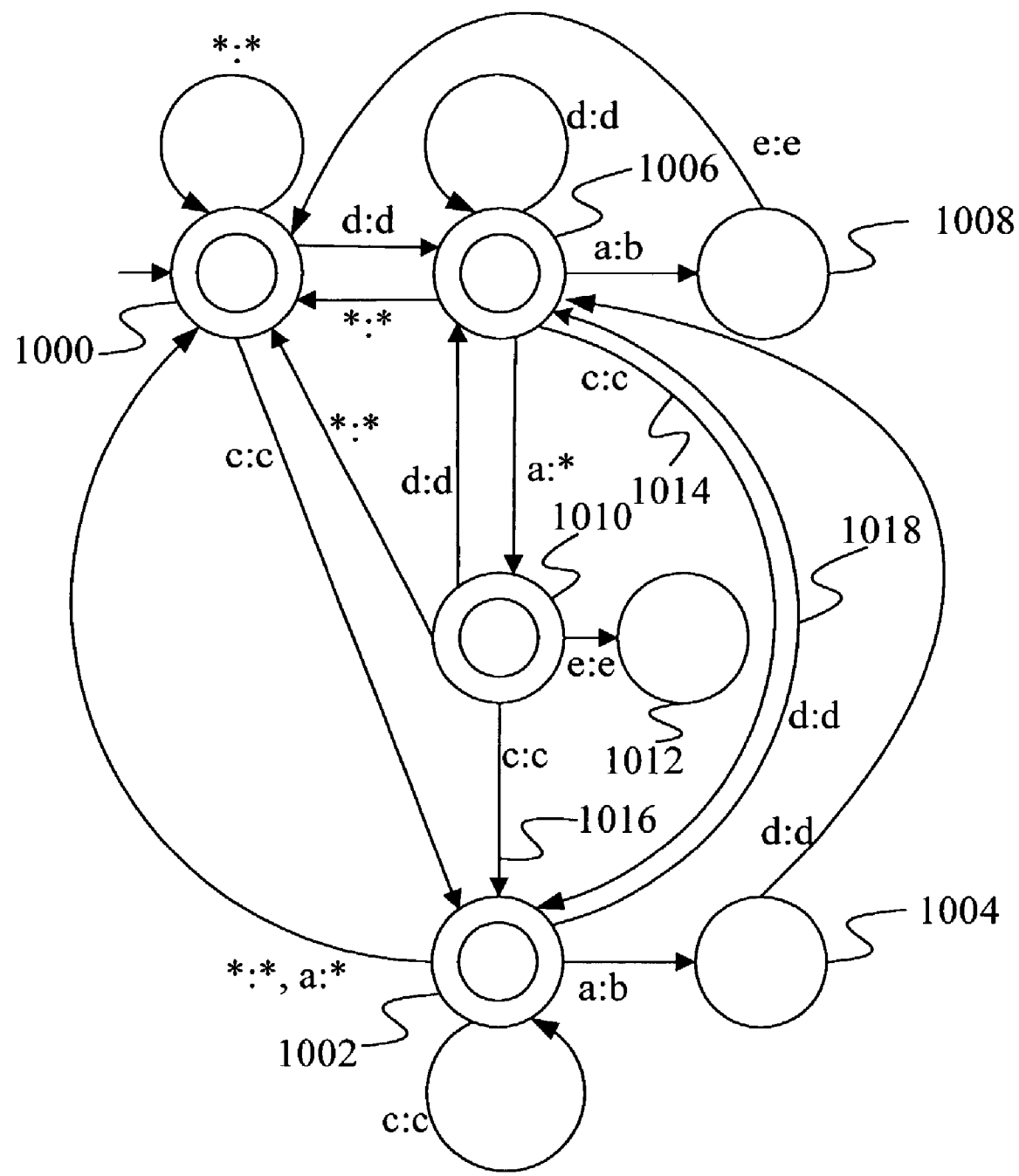
FIG. 10 provides a Finite State Transducer that is formed by combining the Finite State Transducers of FIGS. 8 and 9.

After the individual Finite State Transducers have been formed by inserting the rules into the appropriate templates at step 302 of FIG. 3, the individual Finite State Transducers for each core are combined on a core-by-core basis by a rule combiner 206 in compiler 202 of FIG. 2. One example of such a combination of Finite State Transducers can be seen in FIGS. 8, 9 and 10. FIG. 8 provides a first Finite State Transducer for the core "a:b" and FIG. 9 provides a second Finite State Transducer for the core "a:b". The combined Finite State Transducer for core "a:b" is shown in FIG. 10.

The Finite State Transducer shown in FIG. 8 represents the rule:

a:b→c:c---d:d and the Finite State Transducer shown in FIG. 9 represents the rule:

a:b←d:d---e:e

Two things are to be noted about these rules. First, they involve different operators. Under the present invention, the Finite State Transducers for any operators may be combined at step 304. Second, the right context of the rule for the Finite State Transducer of FIG. 8 forms the left context of the Finite State Transducer of FIG. 9. Thus, the rules execute sequentially.

The first step in combining the Finite State Transducers of FIGS. 8 and 9 is to combine initial states 800 and 900 into a single initial state 1000 in the Finite State Transducer of FIG. 10. States 802 and 804 of FIG. 8 are then inserted in the Finite State Transducer of FIG. 10 as states 1002 and 1004 and states 902, 904, 906, and 908 of FIG. 9 are inserted as states 1006, 1008, 1010, and 1012, respectively. The transitions between the states that are found in the initial Finite State Transducers are maintained in the combined Finite State Transducer with a couple of exceptions. First, because the separate initial states have been replaced by a single initial state 1000, transitions to and from the initial states 800 and 900 are changed to transitions to and from initial state 1000. Second, because the right context of the Finite State Transducer of FIG. 8 is the left context of the Finite State Transducer of FIG. 9, transition 806 from state 804 to state 800 for the right context of the Finite State Transducer of FIG. 8 is changed in the combined Finite State Transducer so that it terminates at state 1006 instead of initial state 1000. This allows the surface sequence "cadae" to trace the states for both "cad" and "dae" by going states 1000, 1002, 1004, 1006, 1008 and back to state 1000.

Lastly, each state that precedes a core transition must be reachable through a left context transition from every accepting state. To do this, additional transitions are added. Specifically, transitions 1014 and 1016 into state 1002 are added to support the left context "c:c" and transition 1018 into state 1006 is added to support the left context "d:d".

Note that additional Finite State Transducers for the same core may be combined with the Finite State Transducer of FIG. 10 by sharing the same initial state, ensuring that there is a left-context transition from each accepting state into the states before the core transition, and properly connecting the right-context transitions to allow for the cascading of rules.

Figure 12:
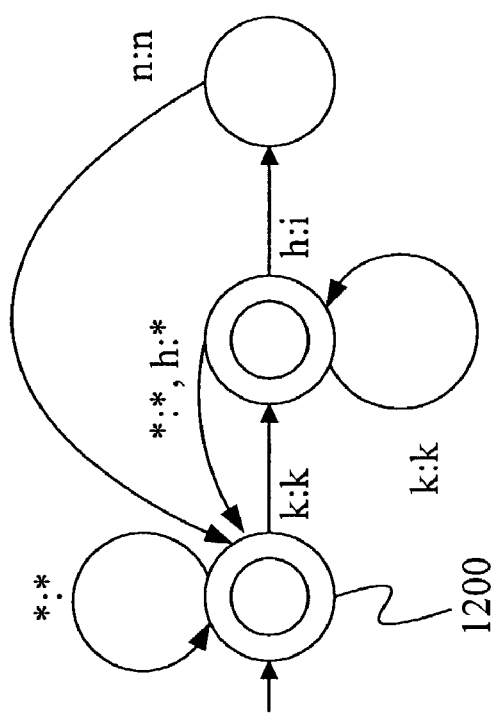
FIG. 12 provides a Finite State Transducer for a second rule with the same core as FIG. 11.
Figure 11:
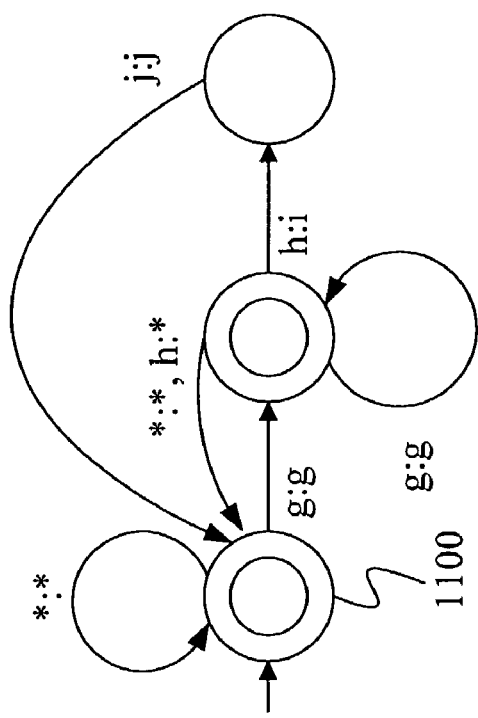
FIG. 11 provides a Finite State Transducer for a rule with a core.
Figure 13:
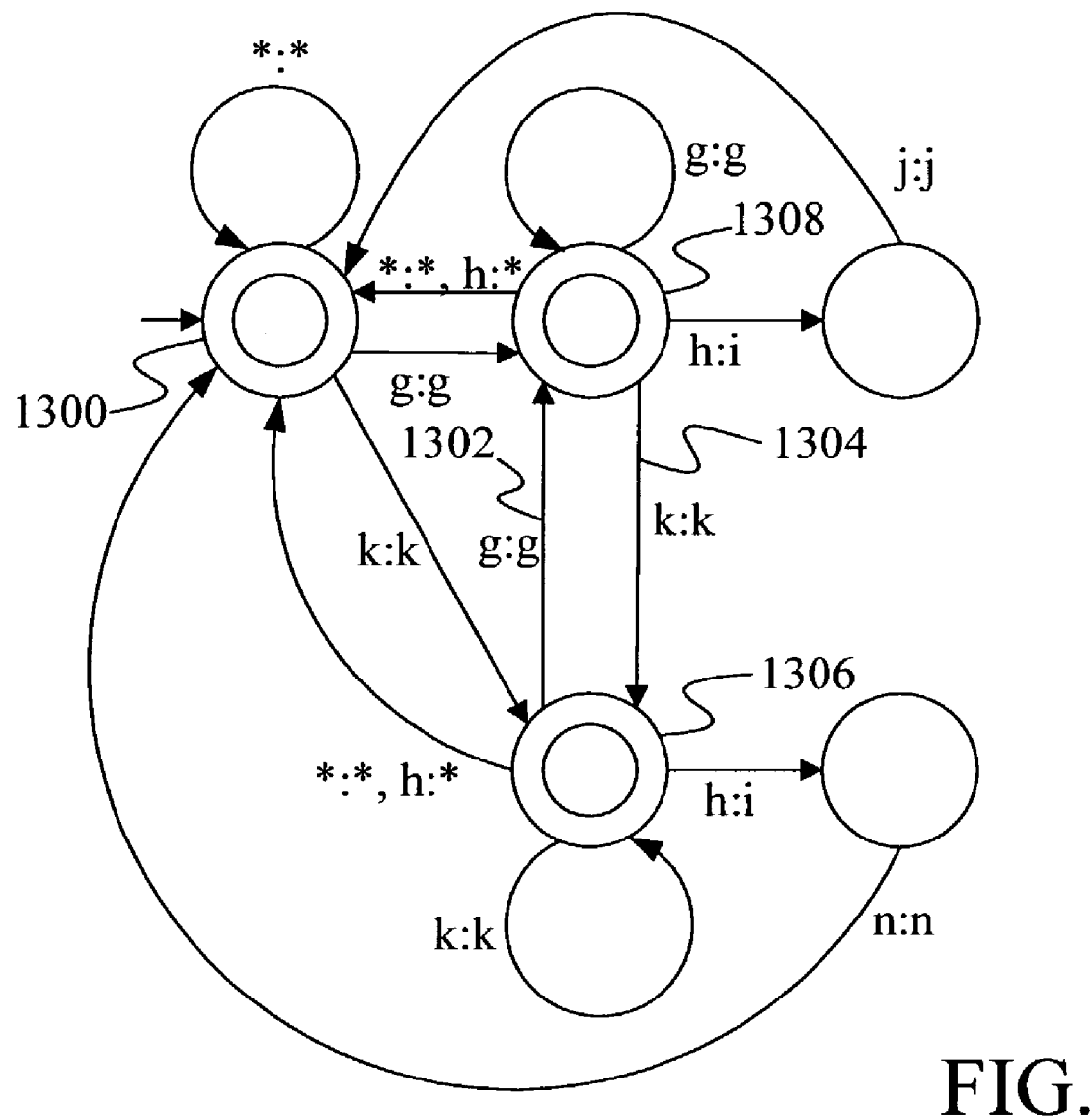
FIG. 13 provides a Finite State Transducer that is formed by combining the Finite State Transducers of FIGS. 11 and 12.

FIGS. 11, 12, and 13 show another example of combining Finite State Transducers for a second core "h:i". The Finite State Transducer in FIG. 11 is for the rule:

h:i→g:g---j:j and the Finite State Transducer in FIG. 12 is for the rule:

h:i→k:k---n:n

As in the previous example, separate initial states 1100 and 1200 of the Finite State Transducers in FIGS. 11 and 12, respectively, are combined into a single initial state 1300 in the Finite State Transducer of FIG. 13. Transitions to and from the individual initial states are changed into transitions to and from the single initial state 1300. Note that because these rules are not cascading, the right context of each rule returns to initial state 1300.

In addition, to enable the left context to occur from any accepting state, transitions 1302 and 1304 into state 1306 and 1308 are added. Transition 1302 supports the left context "g:g" from accepting state 1306 into state 1308. Transition 1304 supports the left context "k:k" from accepting state 1308 into state 1306.

After the Finite State Transducers for a particular core have been combined into a single Finite State Transducer, an optional step of minimizing the combined core Finite State Transducer is performed at step 306 by a minimizer 208 of FIG. 2. Such minimization techniques are well known in the art and involve removing unreachable states and combining equivalent states where equivalent states transition to the same set of states for the same input values.

Figure 14:
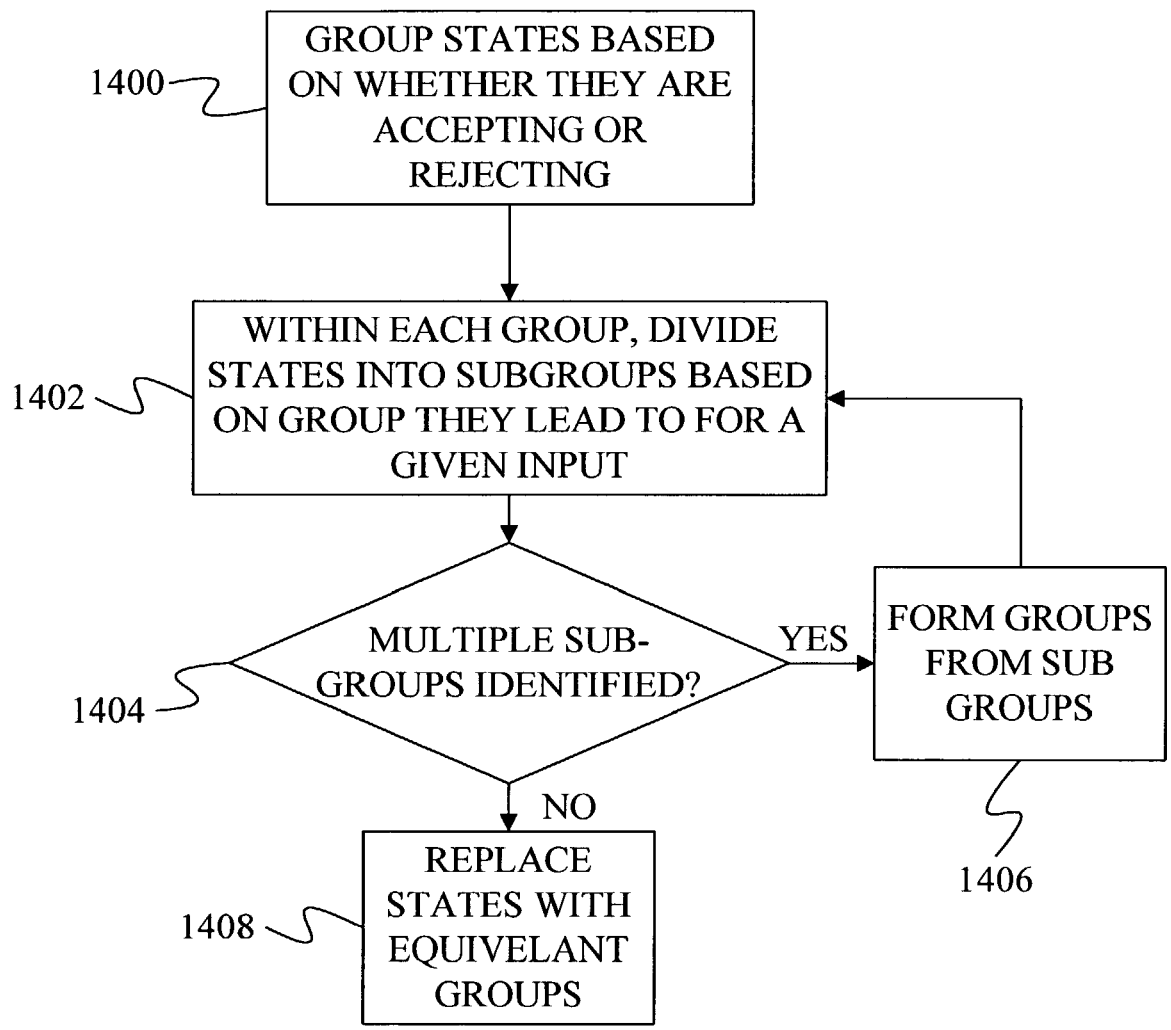
FIG. 14 provides a flow diagram of one method of minimizing Finite State Transducers.

FIG. 14 provides a flow diagram of one technique under the prior art for minimizing Finite State Transducers. The process begins at step 1400 where the states are divided into one of two groups based on whether they are an accepting state or a rejecting state. At step 1402, the states in each group are divided into sub-groups based on the group that they transition to for a given surface form/lexical form pair. Thus, states that transition to a state in the accepting group are put in one sub-group and states that transition to a state in the rejecting group are put in another sub-group.

At step 1404, the method checks to see if at least two sub-groups could be formed for any of the possible surface form/lexical form pairs. If the sub-groups could be formed, the group is divided at step 1406 so that each sub-group becomes a separate group. The process then returns to step 1402 to see if the current set of groups can be further divided. When the groups can no longer be divided a step 1404, the states in each group are combined into a single state and the transitions to and from those individual states are made to and from the single combined state at step 1408.

Figure 15:
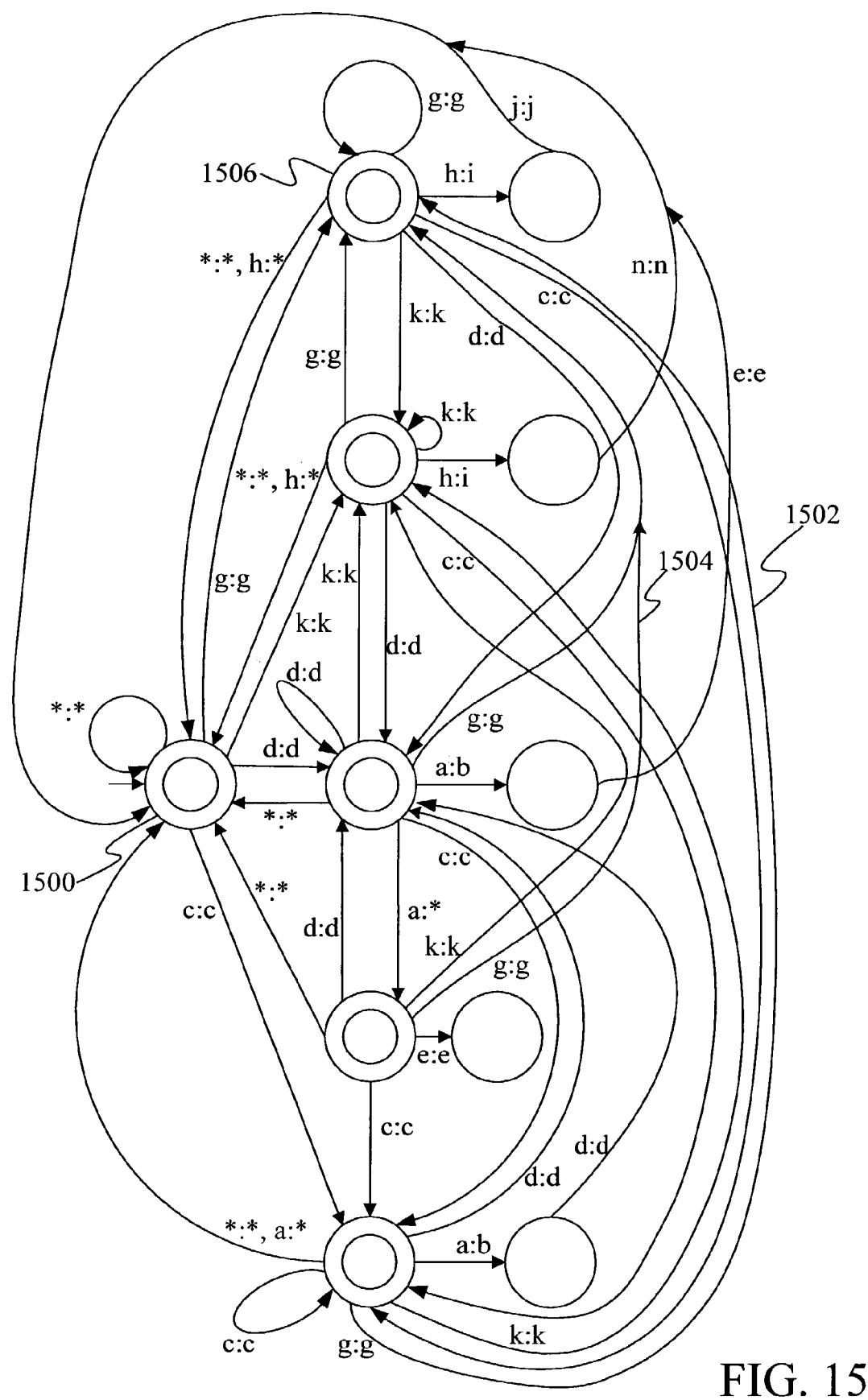
FIG. 15 provides a Finite State Transducer that is formed by combining the Finite State Transducers of FIGS. 10 and 13.

After the core Finite State Transducers have been minimized at step 306, the core Finite State Transducers are combined into a single Finite State Transducer by a core combiner 210 of FIG. 2. FIG. 15 shows a single Finite State Transducer formed by combining the core Finite State Transducers of FIGS. 10 and 13.

As when combining the Finite State Transducers to form the core Finite State Transducer, the step of combining the core Finite State Transducers includes combining the initial states of each core Finite State Transducer into a single state. Thus states 1000 and 1300 become state 1500 in FIG. 15 and transitions to and from states 1000 and 1300 become transitions to and from state 1500.

To support the left context, a transition for each left context must extend from each accepting state to the appropriate state before a core transition. Thus, a number of transitions must be added to support each of the possible left contexts. For example, transitions 1502 and 1504 are added to support the left context "g:g" into state 1506. In addition, transitions for the right context should be modified to permit cascading of rules as was done when forming the core Finite State Transducers.

Note that the Finite State Transducer of FIG. 15 is a small example of a single Finite State Transducer for a set of rules. In practice, the single Finite State Transducer will be much larger.

After the single Finite State Transducer is formed at step 308, it is minimized at step 310 using a minimizer 212. This results in a set Finite State Transducer, which is a single Finite State Transducer that represents all of the orthography rules 200. This set Finite State Transducer is then converted into an executable Finite State Transducer 214 at step 312. Executable Finite State Transducer is capable of being executed directly at runtime. During runtime, a sequence of characters in a surface form 216 is applied to the executable Finite State Transducer 214. Based on the surface form, the Finite State Transducer 214 moves between states and thereby produces a lexical form 218. Because there is a single Finite State Transducer for all of the rules, the runtime execution is much faster than in prior art systems.

Although the present invention has been described with reference to particular embodiments, workers skilled in the art will recognize that changes may be made in form and detail without departing from the spirit and scope of the invention.

What is claimed is:

1. A computer-readable storage medium having computer-executable instructions for performing steps comprising:
    forming a plurality of Finite State transducers by forming a Finite State Transducer for each of a plurality of orthography rules, each orthography rule comprising an operator, a core providing a mapping from a surface form character to a lexical form character, a left context providing a mapping of a surface form character to the left of the surface form character of the core to a lexical form character to the left of the lexical form character of the core, and a right context providing a mapping of a surface form character to the right of the surface form character of the core to a lexical form character to the right of the lexical form character of the core, by performing for each orthography rule steps comprising:
        identifying the operator in the orthography rule, the operator being one of a group of operators comprising may occur, must occur, must occur if a surface form character is found and must not occur;
        selecting a template based on the operator, wherein the template for the may occur operator provides a path to an accepting state that generates a success value when any surface form character is encountered between the surface form character of the left context and the surface form character of the right context and wherein the template for the must occur operator provides a path to an accepting state that generates a success value when a character between the surface form character of the left context and the surface form character of the right context is encountered only when the character encountered between the surface form character of the left context and the surface form character of the right context is the surface form character of the core; and
        inserting elements of the orthography rule into the template to form a Finite State transducer;
    combining at least two of the Finite State Transducers to form a combined Finite State Transducer;
    converting the combined Finite State Transducer into an executable Finite State Transducer; and
    applying a sequence of characters in a surface form to the executable Finite State Transducer to produce a lexical form of the sequence of characters.

2. The computer-readable storage medium of claim 1 wherein inserting elements of an orthography rule comprises inserting the core, left context and right context in the template.

3. The computer-readable storage medium of claim 1 wherein combining at least two Finite State Transducers comprises combining all Finite State Transducers that have a same core.

4. The computer-readable storage medium of claim 3 wherein combining at least two Finite state Transducers comprises forming a first combined Finite State Transducer by combining all Finite State Transducers that have a first core and forming a second combined Finite State Transducer by combining all Finite State Transducers that have a second core.

5. The computer-readable storage medium of claim 4 further comprising combining the first combined Finite State Transducer and the second combined Finite State Transducer to form a set Finite State Transducer.

6. The computer-readable storage medium of claim 4 further comprising minimizing the first combined Finite State Transducer and the minimizing the second combined Finite State Transducer.

7. The computer-readable storage medium of claim 5 further comprising minimizing the set Finite State Transducer.

8. The computer-readable storage medium of claim 7 further comprising forming the executable Finite State Transducer from the set Finite State Transducer.

* * * * *